(No Model.)
C. F. DIETZ.
FISHING HOOK.
No. 377,294. Patented Jan. 31, 1888.
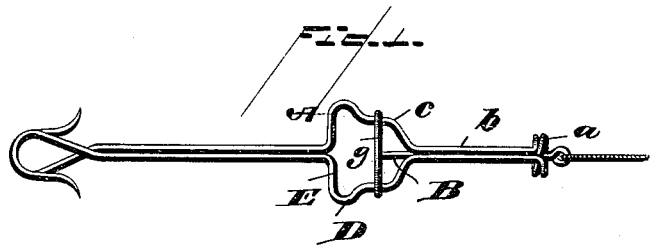
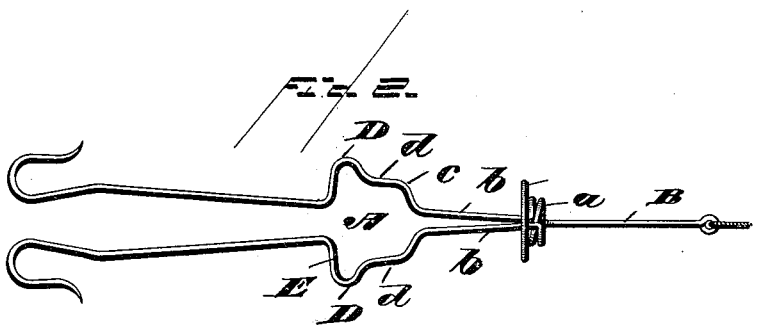
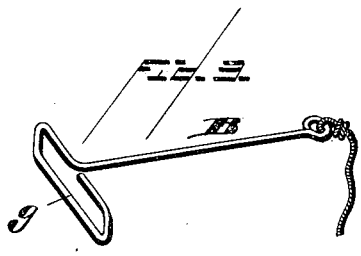
WITNESSES
G. L. Mitchell
T. Edmunds Turpin
INVENTOR
C. F. Dietz
by Frank Sheehy
Attorney

United States Patent Office.

CHRISTOPH FRIEDERIK DIETZ, OF NEW ORLEANS, LOUISIANA, ASSIGNOR OF ONE-HALF TO PASCAL LESTELLE, OF SAME PLACE.

FISHING-HOOK.

SPECIFICATION forming part of Letters Patent No. 377,294, dated January 31, 1888.

Application filed June 8, 1887. Serial No. 240,660. (No model.)

*To all whom it may concern:*

Be it known that I, CHRISTOPH FRIEDERIK DIETZ, a citizen of the United States, residing at New Orleans, in the parish of Orleans and State of Louisiana, have invented new and useful Improvements in Fishing-Hooks, of which the following is a specification, reference being had to the accompanying drawings and the figures and letters thereon.

The object of my invention is to improve that class of fish-hooks in which a slide or trigger is designed to operate in conjunction with a double hook composed of a single wire. This object I attain by the means shown and illustrated in the accompanying drawings, in which—

Figure 1 is a side view of my improved device in a closed position and ready for use. Fig. 2 is a side view of the hooks expanded. Fig. 3 is a view of the slide removed.

Referring by letter to the said drawings, A designates a wire which comprises the double hook. This wire may be of spring-steel or other suitable material.

In carrying out the invention I take the wire A and bend the same about midway of its length, so as to form a lateral vertical eye, $a$, which is designed to serve as a guide for the slide B, and also as a spring for the hooks, as will be presently explained. After forming the eye the branches of the wire are carried straight for a portion of their length, as indicated at $b\ b$, where they are carried outwardly in opposite directions to form rounded shoulders $c\ c$, from whence they are brought slightly inward or approximately straight, as indicated at $d$, and thence outwardly to form shoulder-stops D D, from which latter point they are directed inwardly, as at E, and terminate in fish-hooks of any desired form. It will thus be seen that I form a pair of hooks with an enlargement which affords a seat for a slide-loop to lock the loops in a closed position, and also stops which prevent displacement of the said loop and insure an effective operation of the parts.

B indicates a slide-loop, which is also composed of a single piece of wire. This wire has the loop $g$ formed at its outer end, as shown, and is provided at its opposite end with an eye or the like for the secure attachment of the line.

It will be observed that the loop $g$ is designed to pass over the shoulders $c$ and compress the branches, so as to have the loops overlap each other, as more fully shown in Fig. 1 of the drawings. It will also be observed that the straight integral branch of the loop passes through the eye $a$ of the hooks, and that the said eye serves as a stop for the said loop and prevents it from entirely leaving the hooks.

Having described my invention, what I claim is—

As an improved article of manufacture, a fishing-hook comprising a wire having a lateral vertical coiled eye about midway of its length and rounded shoulder portions forming stops, as described, said wire turned back upon itself and terminating in hooks, as shown, and a slide-loop adapted to compress the hooks and having a straight branch passing through the lateral eye and formed with an eye at its outer end for the attachment of the line, substantially as specified.

CHRISTOPH FRIEDERIK DIETZ.

Witnesses:
    FERGUS KERNAN,
    WILLIAM EVANS.